US00RE35240E

United States Patent [19]

Heywood et al.

[11] E Patent Number: Re. 35,240

[45] Reissued Date of Patent: May 14, 1996

[54] OPTICAL MODULATORS

[75] Inventors: Peter J. Heywood; Richard A. Eggleston, both of Lothian, Scotland

[73] Assignee: GEC-Marconi Avionics (Holdings) Limited, Stanmore, England

[21] Appl. No.: 70,251

[22] Filed: Jun. 2, 1993

Related U.S. Patent Documents

Reissue of:

[64] Patent No.: 4,884,044
Issued: Nov. 28, 1989
Appl. No.: 235,156
Filed: Aug. 23, 1988

[30] Foreign Application Priority Data

Sep. 9, 1987 [GB] United Kingdom ..... 8721152

[51] Int. Cl.[6] ..... G02F 1/03

[52] U.S. Cl. ..... 359/245; 372/12

[58] Field of Search ..... 372/12; 359/245, 359/264, 276, 315, 322

[56] References Cited

U.S. PATENT DOCUMENTS

| | | | |
|---|---|---|---|
| 3,311,845 | 3/1967 | Koester | 372/12 |
| 3,445,826 | 5/1969 | Myers | 372/12 X |
| 3,713,032 | 1/1973 | Wentz | 372/12 |
| 3,820,038 | 6/1974 | Tomlinson | 372/12 |
| 3,965,439 | 6/1976 | Firester | 372/12 |
| 4,375,684 | 3/1983 | Everett | 372/12 X |
| 4,628,222 | 12/1986 | Lewis | 333/153 X |
| 4,739,507 | 4/1988 | Byer et al. | 372/12 X |

FOREIGN PATENT DOCUMENTS

| | | |
|---|---|---|
| 0167143 | 8/1986 | European Pat. Off. . |
| 56-0082278 | 5/1981 | Japan . |
| 196166 | 12/1982 | Japan . |

OTHER PUBLICATIONS

French search report.

*Primary Examiner*—Mark Hellner
*Attorney, Agent, or Firm*—Kerkam, Stowell, Kondracki & Clarke

[57] ABSTRACT

An optical modulator comprises a crystal (15) of material exhibiting the pyroelectric effect, and charge-dissipating means for dissipating any charge built up on the optical faces of the prism. The charge-dissipating means may comprise point electrodes (30) positioned adjacent to the optical faces (21) of the crystal and connected to an alternating-current high-voltage power supply (31). The electrodes produce charged ions which neutralize any charge on the optical faces of the crystal. The crystal may be used as the Q-switch in a laser.

11 Claims, 3 Drawing Sheets

OPTICAL MODULATORS

Matter enclosed in heavy brackets [ ] appears in the original patent but forms no part of this reissue specification; matter printed in italics indicates the additions made by reissue.

Optical modulators are known which comprise crystals of a suitable material whose optical properties may be varied by the application of an electric field across the crystal perpendicular to the optical axis of the crystal. The application of such a field affects the polarisation of optical [iation] *radiation* passing through the crystal. One of the most common applications of such an optical modulator is in the so-called Q-switch laser, in which the modulator crystal is used to vary the optical conditions within the laser cavity so that [laseraction] *laser action* may be either prevented or induced as required. Optimum laser performance requires the Q-switch to change phase modulation of the optical radiation between two distinct and clearly-defined polarisation states. Anything which causes these two states to be less clearly defined will adversely affect the performance of the laser.

A commonly-used material for a laser Q-switch is a crystal of Lithium Niobate. This material exhibits the pyroelectric effect, as a result of which changes in the temperature of the crystal result in the development of static electric charges of opposite polarity at the opposite ends of the crystal. If this charge is allowed to collect on the faces of the crystal then the performance of the laser will be affected. In normal atmospheres some leakage of the charge will occur. However, Q-switched lasers of the type described above are often sealed into an enclosure with an extremely dry atmosphere, and this prevents charge leaking.

*It is possible simply to conduct the charge away from the face. This requires the formation on the end face of an optically-transparent but electrically-conducting layer which is connected to ground. FIG. 3 shows such an arrangement. The main problem with this technique is that the conducting layer 60 interferes with the passage of optical radiation through the end faces of the crystal. Equally, it may be damaged by the power of the optical radiation passing through it.*

It is an object of he invention to provide an optical modulator in which the adverse results of the pyroelectric effect are eliminated, According to the present invention there is provided and optical modulator which includes a crystal of a material exhibiting the pyroelectric effect and means for dissipating any electric charge built up on the optical faces of the crystal, The invention will now be described with reference to the accompanying drawings, in which.

Figure 3:
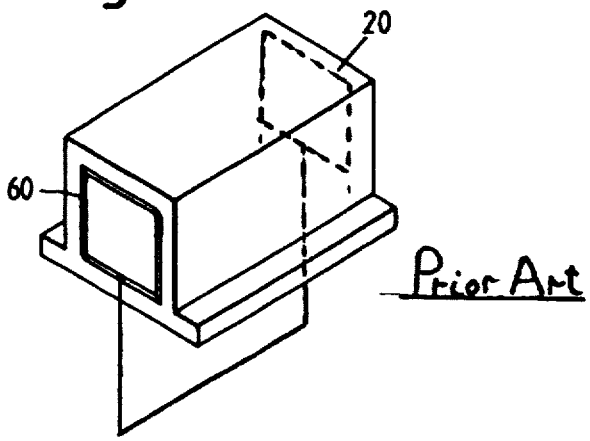
Figure 4:
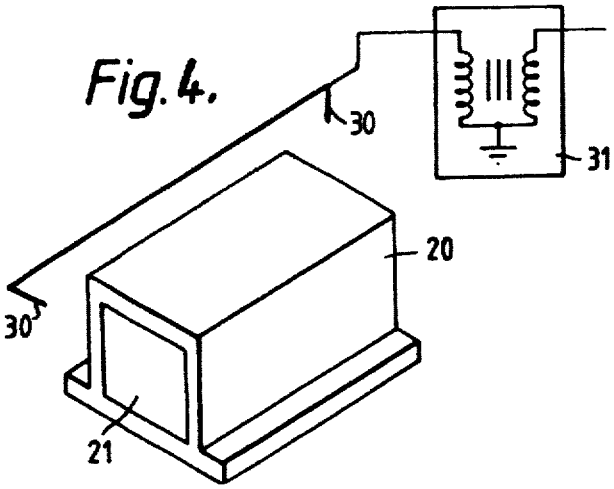
Figure 5:
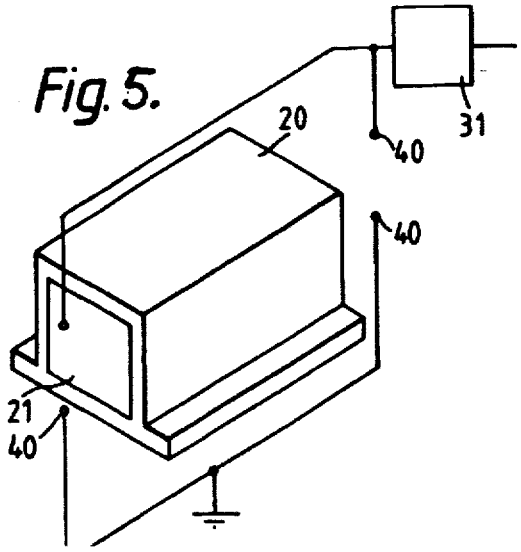

*FIG. 3 diagrammatically illustrates a prior art method, as above described, of dissipating accumulated charge on the faces; and*

FIGS. [3] *4* to 7 are schematic diagrams illustrating different embodiments of the invention.

Figure 1:
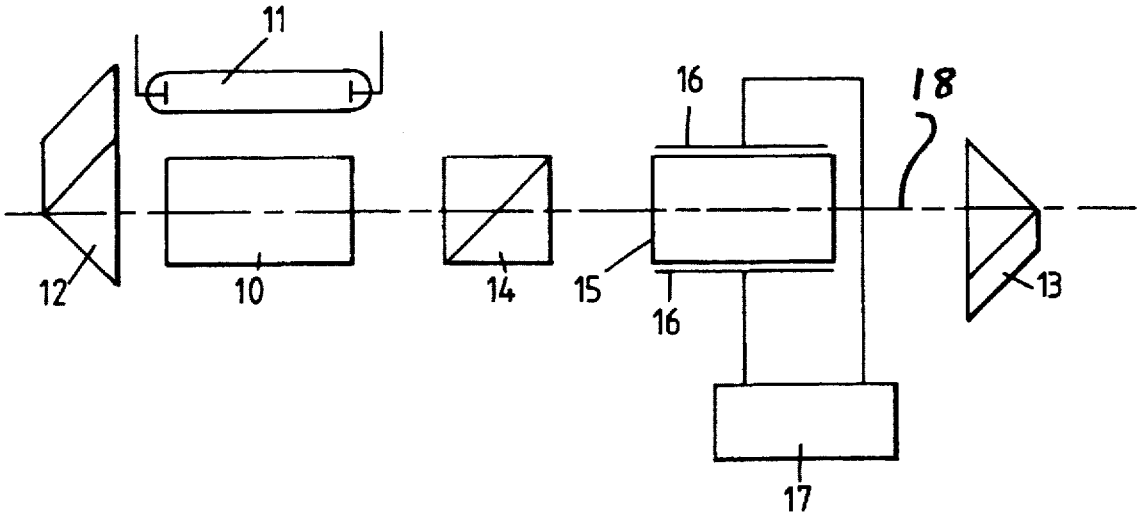
FIG. 1 is a schematic diagram of a common form of Q-switched laser, incorporating an optical modulator.

Referring now to FIG. 1, [as] *a* common form of Q-switched laser includes a rod 10 of laser active material, such as Neodymium-YAG together with an associated flash tube 11 for optically pumping the active material. Two porro prisms 12 and 13 define the optical cavity of the laser which also includes a polariser 14 and a Q-switch 15. The Q-switch is a crystal of a material such as Lithium Niobate and is provided with two electrodes 16 connected to a modulating power supply 17. The optical components are arranged along an optical axis 18, with the electrodes 16 on the crystal 15 arranged on opposite sides of the optical axis.

Figure 2:
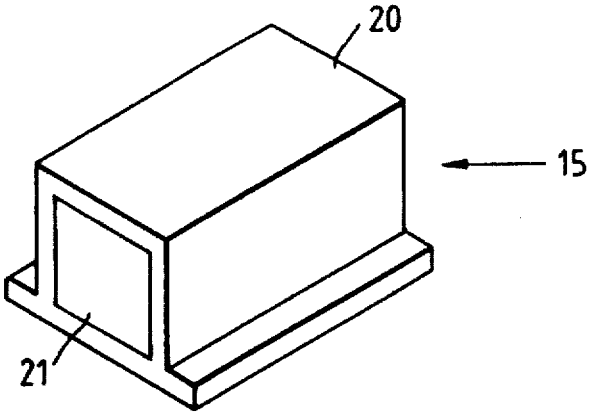
FIG. 2 is a perspective view of an optical modulator crystal; [and]

The Q-switch 15 comprises a crystal of material formed into a block and fastened in an electrically insulating housing 20 as shown in FIG. 2. The end faces 21 are those through which the laser radiation passes. It is on these faces in particular that a static electric charge may build up due to the pyroelectric effect. Removal of this static electric charge may be achieved basically in two ways. One involves neutralising the charge in some way, whilst the other involves conducting the charge away from the faces of the crystal. The polarity of the charge depends upon whether the temperature of the crystal is increasing or decreasing.

FIG. [3] *4* illustrates one technique which may be used to neutralise any static charge on the end faces of the crystal. A source of ions is provided adjacent to each face by emission from point electrodes 30 adjacent to each face but away from the path of any optical radiation. A high-voltage power supply 31 is connected to the electrodes. When the supply 31 is energised a stream of ions is emitted by each electrode 30 and these ions of opposite charge to that on the adjacent face of the crystal will be attracted to that face to neutralise the charge caused by the pyroelectric effect. Since the polarity of the charge on a face may vary the power supply 31 should preferably be a high voltage alternating current supply.

As an alternative to the arrangement of FIG. [3] *4* the neutralising ions may be produced by a spark discharge. This may use the arrangement shown in FIG. [4] *5* in which a pair of electrodes 40 is provided, forming a spark gap adjacent to each face, again well clear of the path of optical radiation. One electrode of each pair will be, conveniently, connected to ground. The high voltage power supply 31, which may be a direct-current supply, may be triggered to produce a spark between each pair of electrodes. This produces a cloud of both positive and negative ions, the appropriate ones of which will neutralise the charge on the face of the crystal.

The techniques described above with reference to FIGS. [3 and 4] *4 and 5* might best be used before the laser is activated since the ions produced by the electric discharges may interact with the modulating electrodes on the sides of the Q-switching crystal.

A technique which does not require a high-voltage power supply to produce neutralising ions is shown schematically in FIG. [5.] *6*. This involves placing near to each end face of the Q-switching crystal a small radioactive source 50. Each of these sources will emit ionising radiation towards the adjacent face of the crystal. Such radiation will be arrested both by the atmosphere in front of the end faces and by the faces themselves, with the generation of ion pairs, some of which will neutralise the static charge. This process is continuous as it is not practically possible to control the emission of alpha particles from the source.

Figure 6:
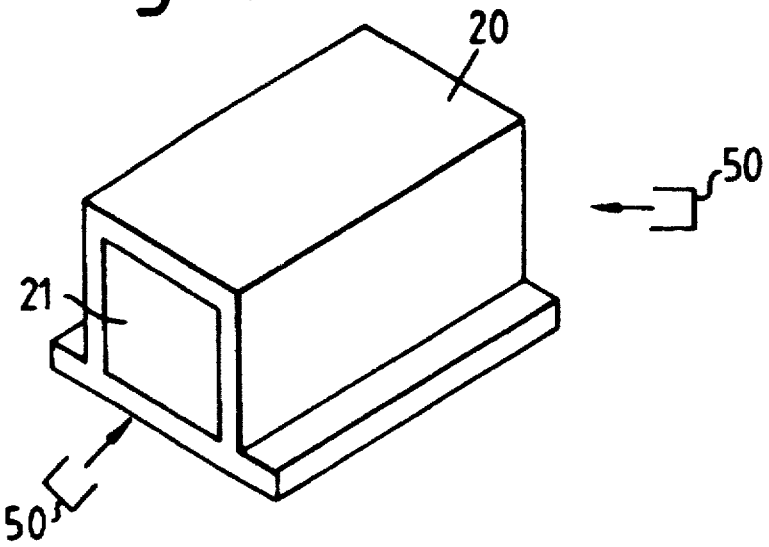

As an alternative to producing ions to neutralise any charge built up on the end faces of the crystal, [it is possible simply to conduct the charge away from the face. This requires the formation on the end face of an optically-transparent but electrically-conducting layer which is connected to ground. FIG. 6 shows such an arrangement. The main problem with this technique is that the conducting layer 60 must not interfere with the passage of optical radiation through the end faces of the crystal. Equally, it must not be damaged by the power of the optical radiation passing through it.]

Figure 7:
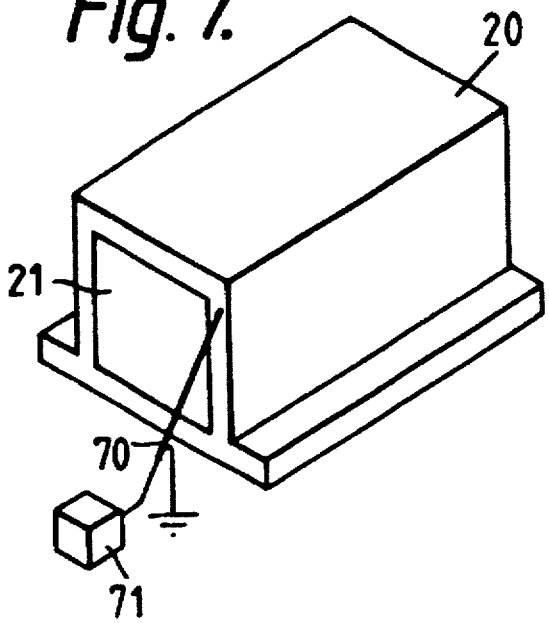

[As an alternative to providing a conducting layer on each face of the crystal] it is possible to remove the accumulated charge intermittently by wiping the face with an electrically-conducting material. FIG. 7 illustrates an arrangement using an electrically conducting blade 70 connected to ground and wiped over the face 21 of the crystal by a motor 71. Other mechanical arrangements could be used.

The optical components of a Q-switched laser are sometimes enclosed in a sealed container so that the atmosphere may be controlled, particularly to prevent misting of optical surfaces during conditions where condensation might occur. Any of the charge-removal techniques described above may be used inside such a sealed container. The techniques may also be used on Q-switching crystals of other materials than Lithium Niobate which exhibit the pyroelectric effect.

The optical modulator may be used in other applications than Q-switched lasers, and all the techniques described above are applicable to such applications.

We claim:

1. An optical modulator of the Q-switch type comprising:

*an optical path;* a crystal of a material which exhibits the pyroelectric effect [and] *disposed on said optical path, said crystal* having two opposed optical faces through which laser radiation may pass along [a] *said optical* path;

means to apply an electric field to the crystal [ransverse] *transverse* to said path in order to switch said modulator; and charge-dissipating means for dissipating any static electric charge built up on the two opposed optical faces of the crystal due to the pyroelectric effect, *said charge dissipating means being disposed adjacent to said optical faces but being disposed so as normally to lie outside of said path.*

2. A modulator as claimed in claim 1 which includes ionising means located adjacent to the optical faces of the crystal and operable to generate ions of opposite polarity to the charge on said optical face.

3. A modulator as claimed in claim 2 in which the ionising means comprise a point electrode connected to a high-voltage power supply.

4. A modulator as claimed in claim 3 in which the high-voltage power supply generates an alternating voltage for application to the point electrodes.

5. A modulator as claimed in claim 2 in which the ionising means comprise a spark gap.

6. A modulator as claimed in claim 2 in which the ionising means comprise a radioactive source capable of emitting ionising radiation towards said optical faces.

[7. A modulator as claimed in claim 1 in which the optical faces of the crystal are provided with a layer of electrically-conducting material connected to the ground.]

8. A modulator as claimed in claim 1 in which each optical end face is provided with an electrically-conductive wiper movable across the said face and connected to ground.

9. A modulator as claimed in claim 1 which forms the Q-switch of a Q-switched laser.

*10. An optical modulator of the Q-switch type comprising:*

*a crystal of a material which exhibits the pyroelectric effect and having two opposed optical faces through which laser radiation may pass along a path;*

*means to apply an electric field to the crystal transverse to said path in order to switch said modulator;*

*charge-dissipating means for dissipating any static electric charge built up on the two opposed optical faces of the crystal due to the pyroelectric effect; and*

*a radioactive source located adjacent to the optical faces, said radio active source being capable of emitting ionising radiation towards said optical faces to generate ions of opposite polarity to any static charge thereon whereby to dissipate the static charge.*

*11. An optical modulator of the Q-switch type comprising:*

*a crystal of a material which exhibits the pyroelectric effect and having two opposed optical faces through which laser radiation may pass along a path; means to apply an electric field to the crystal transverse to said path in order to switch said modulator; and*

*charge-dissipating means for dissipating any static electric charge built up on the two opposed optical faces of the crystal due to the pyroelectric effect, which includes ionising means located adjacent to the optical faces of the crystal and operable to generate ions of opposite polarity to the charge on said optical face.*

*12. An optical modulator of the Q-switch type comprising:*

*a crystal of a material which exhibits the pyroelectric effect and having two opposed optical faces through which laser radiation may pass along a path; means to apply an electric field to the crystal transverse to said path in order to switch said modulator; and*

*charge-dissipating means for dissipating any static electric charge built up on the two opposed optical faces of the crystal due to the pyroelectric effect, which includes ionising means located adjacent to the optical faces of the crystal and operable to generate ions of opposite polarity to the charge on said optical face, in which the ionising means comprise a radioactive source capable of emitting ionising radiation towards said optical faces.*

* * * * *